US009811644B1

(12) United States Patent
Ahmed et al.

(10) Patent No.: US 9,811,644 B1
(45) Date of Patent: Nov. 7, 2017

(54) METHOD FOR DISTRIBUTION OF LICENSES BASED ON GEOGRAPHICAL LOCATION

(71) Applicant: Telefonaktiebolaget L M Ericsson (publ), Stockholm (SE)

(72) Inventors: Abu Shohel Ahmed, Espoo (FI); Jaime Jiménez, Helsinki (FI); Patrik Salmela, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 55 days.

(21) Appl. No.: 14/786,785

(22) PCT Filed: May 27, 2013

(86) PCT No.: PCT/SE2013/050600
§ 371 (c)(1),
(2) Date: Oct. 23, 2015

(87) PCT Pub. No.: WO2014/193274
PCT Pub. Date: Dec. 4, 2014

(51) Int. Cl.
*H04L 9/00* (2006.01)
*G06F 21/10* (2013.01)
(Continued)

(52) U.S. Cl.
CPC .......... *G06F 21/105* (2013.01); *H04W 4/008* (2013.01); *H04W 4/021* (2013.01)

(58) Field of Classification Search
CPC ................................................. H04L 2209/603
See application file for complete search history.

(56) References Cited

U.S. PATENT DOCUMENTS 5,204,897 A  4/1993  Wyman
7,603,318 B1 * 10/2009  Colosso ................. G06F 21/10
                                                                705/51
(Continued)

FOREIGN PATENT DOCUMENTS

EP   2012494 A2   1/2009
WO   2012058457 A1   5/2012

OTHER PUBLICATIONS

Hancke, G., et al., "An RFID Distance Bounding Proposal," Proceedings of IEEE/Create-Net SecureComm 2005, Athens, Greece, Sep. 5, 2005, IEEE Computer Society Press, pp. 67-73.
(Continued)

*Primary Examiner* — Josnel Jeudy
(74) *Attorney, Agent, or Firm* — Coats & Bennett, PLLC

(57) ABSTRACT

A system is described for a license provider to distribute licenses for software applications. A license server (102) is operated by the license provider to distribute licenses to user devices (110). At least one local interface device such as an NFC pad (104) is provided at a known geographical location, configured to communicate with the license server, and further configured to communicate with a user device (110) when located less than a predetermined maximum distance from the local interface device. The local interface device is configured to be authenticated to the license server and provides a mechanism for a user device (110) communicating with the local interface device (104) to use the authentication of the local interface device to obtain a license from the license server (102).

50 Claims, 11 Drawing Sheets

(51) Int. Cl.
*H04W 4/00* (2009.01)
*H04W 4/02* (2009.01)

(56) References Cited

U.S. PATENT DOCUMENTS

| | | | | |
|---|---|---|---|---|
| 7,793,105 | B2* | 9/2010 | Korkishko | H04L 63/0492 |
| | | | | 713/168 |
| 9,251,334 | B1* | 2/2016 | Molitor | G06F 21/10 |
| 2002/0138442 | A1* | 9/2002 | Hori | G06F 21/10 |
| | | | | 705/59 |
| 2002/0176579 | A1 | 11/2002 | Deshpande et al. | |
| 2004/0127196 | A1* | 7/2004 | Dabbish | G06F 21/10 |
| | | | | 455/411 |
| 2007/0100763 | A1 | 5/2007 | Kim | |
| 2007/0287471 | A1 | 12/2007 | Wood | |
| 2008/0141378 | A1* | 6/2008 | Mclean | G06F 21/10 |
| | | | | 726/26 |
| 2009/0006261 | A1* | 1/2009 | Bernstein | G06F 21/10 |
| | | | | 705/59 |
| 2009/0106824 | A1* | 4/2009 | Morel | H04W 12/06 |
| | | | | 726/4 |
| 2010/0031043 | A1* | 2/2010 | Burger | G06F 21/32 |
| | | | | 713/170 |

OTHER PUBLICATIONS

Open Mobile Alliance, "DRM Specification V2.0," Draft Version 2.0, Document Reference: OMA-DRM-DRM-V2_0-20040420-D, Open Mobile Alliance Ltd., Apr. 20, 2004, pp. 1-145.

Mundt, T., "Location Dependent Digital Rights Management," Computers and Communications, 2005. ISCC 2005. Proceedings. 10th IEEE Symposium on IEEE, Cartagena, Murcia, Spain, Jun. 27, 2005.

Bishr, M., "Geospatial Digital Rights Management with focus on Digital Licensing of GML datasets," International Institute for Geo-Information Science and Earth Observation, Enschede, Netherlands, Mar. 3, 2006.

Hsu-Chen, C., et al., "A Secure and Practical Key Management Mechanism for NFC Read-Write Mode," 2011 13th International Conference on Advanced Communication Technology (ICACT), Seoul, Korea, Feb. 13, 2011, pp. 1095-1011.

Messerges, T., et al., "Digital rights management in a 3G mobile phone and beyond," Proceedings of the 3rd ACM workshop on Digital rights management, DRM'03, Washington D.C., US, Oct. 27, 2003, ACM, pp. 27-38.

* cited by examiner

METHOD FOR DISTRIBUTION OF LICENSES BASED ON GEOGRAPHICAL LOCATION

TECHNICAL FIELD

The present invention relates to the distribution of software licenses based on geographical location.

BACKGROUND

Licensing policies are frequently used mechanisms by which end users gain access to software. Such policies vary. Common license types include "node locked", "floating", "site" and "metered". In node locked mode, only particular devices are allowed to use the software. In floating mode, a fixed number of copies of the software to which the license is attached may be used at any one time. In site mode, use of the licensed software is restricted within a certain area (e.g., within an enterprise domain). In metered mode, the license is modelled as a pay per use (e.g., hourly charge) model. Each license includes a licensing policy, which defines the usage policy, enforcement policy, and relevant information about the license. A license server usually maintains the number of free licenses and records of devices/people to whom the license is currently assigned.

In a basic license sharing model, each license can be considered as a resource having 1 to n number of attributes. The attributes define essential information about the license e.g. license type, expiry date, no of copies and so on. The number of attributes can vary on applications and enforcement model of the license server.

It is common for fixed licenses to be provided to users. These licenses often effectively bind an application to the machine were it is installed. Such licenses can then only be used on a per-device basis.

As an example, machines operating in a corporate network often use a license/update server inside the corporate network. Another example is libraries and university campuses; they have common areas with machines used by all students. Students log into an one of these machines in order to use the available software (e.g. word processing software, spreadsheets, graphical software etc). However, in both of these scenarios any documents or data generated by the user is stored on the local machine, and if the user wants to keep it for later use he or she needs to find a way to transmit the data to his/her own device.

These restrictions create an inflexible licensing system causing unnecessary complexity for end users. The capabilities of mobile devices have dramatically increased in recent years. Some of the latest handsets have multi-core processors and are very high-end, with more RAM, more storage, faster CPUs and CPUs. Such hardware characteristics make them capable of running desktop-level operating systems and software. It would therefore be desirable to provide a flexible licensing system which would enable users to access software and documents using their own devices under the control of the owner of such licenses.

SUMMARY

In accordance with one aspect of the present invention there is provided a system for a license provider to distribute licenses for software applications. The system comprises a license server operated by the license provider for distributing licenses to user devices. The system also comprises at least one local interface device at a known geographical location, configured to communicate with the license server, and further configured to communicate with a user device when located less than a predetermined maximum distance from the local interface device. The local interface device is configured to be authenticated to the license server, and provides a mechanism for a user device communicating therewith the local interface device to use the authentication of the local interface device to obtain a license from the license server.

The invention thus enables the sharing of licensed software on any user device, providing that the geographical location of the device can be fixed (for example in the premises of the organisation owning the license). The fixing of the location can be achieved by specifying that the license can only be obtained when the user device is less than a predetermined maximum distance from the local interface device, whose location is itself fixed—again, optionally, in the premises of the service provider.

The local interface device may be configured to communicate with the user device using a short range wireless communications system, so that the predetermined maximum distance is determined by the signal range of the short range wireless communications system. In one embodiment the short range wireless communications system is Near Field Communication (NFC), in which case the local interface device may be an NFC pad.

The user device may include a DRM agent for negotiating the provision of the license with the license server and controlling operation of a software application under the license. The DRM agent may be preloaded onto the user device or may be obtained via the local interface device.

The DRM agent may be configured to terminate use of the application when the user device moves away from the local interface device by more than the predetermined distance. Alternatively (or in addition) the license may have a lifetime, and the DRM agent may be configured to terminate use of the application when the lifetime has expired.

In accordance with another aspect of the present invention there is provided a user device for operating a software application under a license obtained from a license provider. The user device comprises a processor and a memory, said memory containing instructions executable by said processor to cause the processor to exchange data, via an input/output unit operatively connected to the processor, with a local interface device at a fixed geographical location when the user device is located less than a predetermined maximum distance from said local interface device. The processor is further caused to negotiate the provision of the license from a license server maintained by the license provider by exchanging data with the local interface device so as to make use of an authentication of the local interface device to the license server. The software application is then executed under the license under the control of a DRM agent.

The input/output unit may be a short range wireless communications system transmit/receive unit such as an NFC unit and the local interface device may be an NFC pad so that the predetermined maximum distance is determined by the range of an NFC signal between the user device and the NFC pad.

The DRM agent may be configured to cause the processor to send a license request message, intended for the license server, to the local interface device, to receive the license back from the local interface device, and to launch the application following receipt of the license.

The DRM agent may be configured to cause the processor to terminate operation of the application if the user device is moved further than the predetermined distance from the local interface device.

Alternatively, the DRM agent may be configured to cause the processor to receive a token from the local interface device, send a license request message including the token towards the license server, receive the license from the license server, and launch the application. The license may have a lifetime, the DRM agent being configured to cause the processor to terminate use of the application when the lifetime has expired.

The DRM agent may be configured to cause the processor to send an application closed message towards the license server if the application is closed by the user, the application closed message including an identification of the license.

The DRM agent may be preloaded on the device, or may be downloaded via the local interface device (or downloaded elsewhere).

The user device may be configured to delegate an obtained license to a further user device upon request, if the license allows for this.

In accordance with another aspect of the present invention there is provided a local interface device in a network for distributing licenses for software applications. The local interface device comprises a processor and a memory, said memory containing instructions executable by said processor to cause the processor to exchanging data, via an input/output unit, with a user device when the user device is less than a predetermined maximum distance from the local interface device, and to communicate with a license server in the network via a receive transmit unit. The memory further contains instructions to cause the processor to authenticate the local interface device to the license server for receipt of licenses and to provide a mechanism for using that authentication to enable the user device to obtain a license.

The input/output unit may be a short range wireless communications system transmit/receive unit so that the predetermined maximum distance is determined by the signal range of the short range wireless communications system, which may be NFC.

The local interface device may be configured so as to receive data packets forming a license request message from the user device, sign each packet to confirm to the license server that it has passed through the local interface device, send the signed packets through the network towards the license server, receive signed data packets forming a license from the license server license server, and send the packets forming the license to the user device.

Alternatively, the local interface device may be configured so as to receive a license request message from the user device, sign the license request message to confirm to the license server that it has passed through the local interface device, send the signed license request message through the network towards the license server, receive a license from the license server license server, and send the license to the user device.

The processor may choose whether to block or to forward the license request message based on information contained therein.

The local interface device may be configured to send an application closed message towards the license server if the application is closed on the user device or if the user device is moved further than the predetermined distance from the local interface device, the application closed message including an identification of the license.

The local interface device may be configured to generate a token verifiable by the license server and usable by the user device to include in a license request message to the license server, and send the token to the user device. The token may be cryptographically bound to a private key of the local interface device.

When a subsequent user device connects to the local interface device, the device may generate a new token and send a token cancellation message to the license server invalidating the previous token.

The local interface device may be configured to carry out a distance bound check to confirm that the user device is within the predetermined maximum distance before forwarding the signed packets or license request to the license server or forwarding the token to the user device.

The local interface device may further comprise a peripheral interface unit for connection to peripheral user interface devices for use by a user when the user device is connected to the local interface device.

In accordance with another aspect of the present invention there is provided a license server for distributing licenses for software applications to user devices. The license server comprises a processor and a memory, said memory containing instructions executable by said processor to cause the processor to communicate, via a receive/transmit unit, with at least one local interface device at a known geographical location, and/or with at least one user device. The instructions contained in the memory further cause the processor to authenticate the local interface device, receive a license request message including an identifier or signature of the authenticated local interface device, and issue a license towards the user device.

The license server may be configured to receive an application closed message from the user device or local interface device, the application closed message identifying that the license is no longer in use, and increase a tally of available licenses as a result of the license no longer being in use.

In accordance with another aspect of the present invention there is provided a method of operating a software application on a user device under a license obtained from a license provider. The method comprises establishing communication with a local interface device at a known geographical location when the user device is located less than a predetermined maximum distance from the local interface device, and negotiating the provision of the license from a license server maintained by the license provider making use of the communication with the local interface device and an authentication of the local interface device to the license server.

A license request message may be sent from the user device to the local interface device to be forwarded towards the license server using the authentication of the local interface device at the license server. The license may then be received from the local interface device. The application may be terminated at the user device if the user device is moved more than the predetermined maximum distance away from the local interface device.

Alternatively, a token containing an identifier of the local interface device may be received. A license request message including the token may be generated and sent towards the license server. The license may be time-limited.

In accordance with another aspect of the present invention there is provided a method of using a local interface device in the distribution of licenses for a software application in a network. The method comprises locating the local interface device at a known geographical location, and negotiating credentials with a license server so as to authenticate the local interface device to the license server. The local interface device establishes communication with a user device when the user device is less than a predetermined maximum distance from the local interface device. The local interface device receives a license request message from the user device, signs the license request message or data packets forming the license request message, and forwards the signed license request message towards a license server in the network. The local interface device then receives a signed license from the license server, and sends the license to the user device.

In accordance with another aspect of the present invention there is provided a method of using a local interface device in the distribution of licenses for a software application in a network. The method comprises locating the local interface device at a known geographical location, and negotiating credentials with a license server so as to authenticate the local interface device to the license server. The local interface deice establishes communication with a user device (110) when the user device is less than a predetermined maximum distance from the local interface device, generates a token verifiable by a license server in the network and usable by the user device to include in a license request sent to the license server, and sends the token to the user device.

Upon establishing communication with a subsequent user device, the local interface device may generate a new token, send the new token to the subsequent user device, and send a token cancellation message to the license server invalidating the previous token.

The local interface device may carry out a distance bound check to confirm that the user device is within the predetermined maximum distance before forwarding the signed license request message to the license server or forwarding the token to the user device.

In accordance with another aspect of the present invention there is provided a method of distributing licenses for software applications from a license server. The method comprises authenticating a local interface unit at a known geographical location, receiving a license request message including an identifier of the authenticated local interface device, and issuing a license towards a user device located less than a predetermined distance from the local interface device.

The license server may maintain a license database, and only issue the license if not all of the licenses are in use by other user devices.

In accordance with another aspect of the present invention there is provided a method of distributing licenses for software applications. The method comprises authenticating at least one local interface device at a known geographical location to a license server. Communication is established between the local interface device and a user device when the user device is less than a predetermined maximum distance from the local interface device. A license request message is received at the license server based on the authentication of the local interface device. If the authentication is correct (and if there are free licenses) a license is sent from the license server towards the user device. The license is received at the user device, which operates an application under the received license.

The invention also provides a computer program comprising computer readable code which, when run on a device, causes it to behave as any device described above.

There is also provided a computer program for distributing licenses which, when run on a device, causes the device to execute the any method described above.

The invention also provides a memory comprising a computer program as described above and a computer readable means on which the computer program is stored. The memory may be arranged in the form of a computer program product.

BRIEF DESCRIPTION OF THE DRAWINGS

Some preferred embodiments of the invention will now be described by way of example only and with reference to the accompanying drawings, in which.

DETAILED DESCRIPTION

The rapid growth in the number of IP-enabled embedded devices is giving rise to the "Internet of Things" and to the wide adoption of Machine-to-Machine (M2M) technologies. One of the technologies likely to be ubiquitous is Near Field Communication (NFC).

NFC is a set of standards enabling smartphones and similar devices to establish radio communication with each other by touching them together or bringing them into close proximity, (typically a few centimeters). An NFC communicator may operate as an initiator if the device seeks to initiate the near field communication, or as target if the NFC communicator is receptive to initiation. NFC was initially developed from Radio Frequency Identification (RFID) systems and has improved on these with the addition of peer-to-peer connections (connection between two powered devices) and the emulation of a passive proximity RFID tag.

There are already many NFC-capable mobile phones that can communicate with other NFC-enabled phones or RFID tags. Users can exchange information using the NFC interface of the phone, for which the User devices need to be very close to each other (~5 cm). It is likely that, in the future, more devices will be enabled with NFC capabilities.

Digital Rights Management (DRM) and various licensing mechanisms have been practiced in the entertainment industry for decades. These mechanisms help to protect the rights of content producers that have some content used on the end devices. The usual method is for content owners to use a cryptographic system to lock their content unless the end user acquires a key to unlock it; such keys are purchased from an authorized licensing party. Licenses associated with these keys may include other restrictions in the form of e.g. timestamps, number of reproductions of the content, number of end-users able to access the content.

These approaches can be combined to make it possible to provide temporary licenses to users of mobile devices on the basis of their geographical location. For example, a user might be able to operate a particular piece of software only if he is located actually on the premises of a service provider (e.g. library) owning the license. The geographical location can be restricted by the use of NFC communicators in the service provider's premises.

Figure 1:
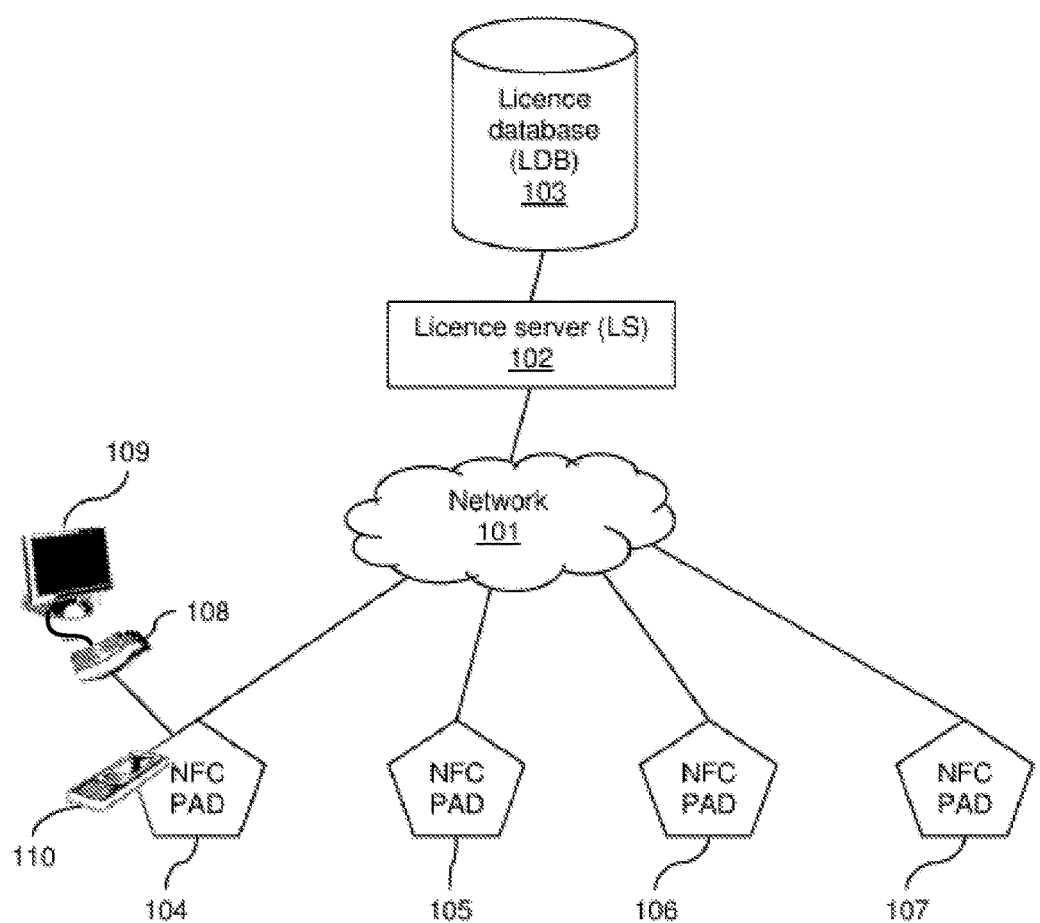
FIG. 1 is a schematic representation of elements of a network 101 operated by an organisation such as a university or library.

FIG. 1 is a schematic representation of elements of a network 101 operated by an organisation such as a university or library. A License Server (LS) 102 associated with a License Database (LDB) 103 is connected to the network. The LS 102 and LDB 103 may form part of the infrastructure or may be connected to it as a third party service. The LDB 103 contains a number of licenses for software applications purchased by the organisation for use on its premises.

The organisation also maintains working areas in which local interface devices such as NFC pads (NFC communicators) 104-107 have been put in place, optionally with external input/output devices such as keyboard 108 and screen 109. The NFC pads are connected to the network 101 and to the i/o devices if present. The NFC pads are designed to communicate with NFC-enabled user devices 110. The NFC pad can work as a docking station for a NFC-enabled user device, providing connectivity from the screen 109 and keyboard 108 to the user device 110, or as a connector-less NFC pad.

Figure 2A:
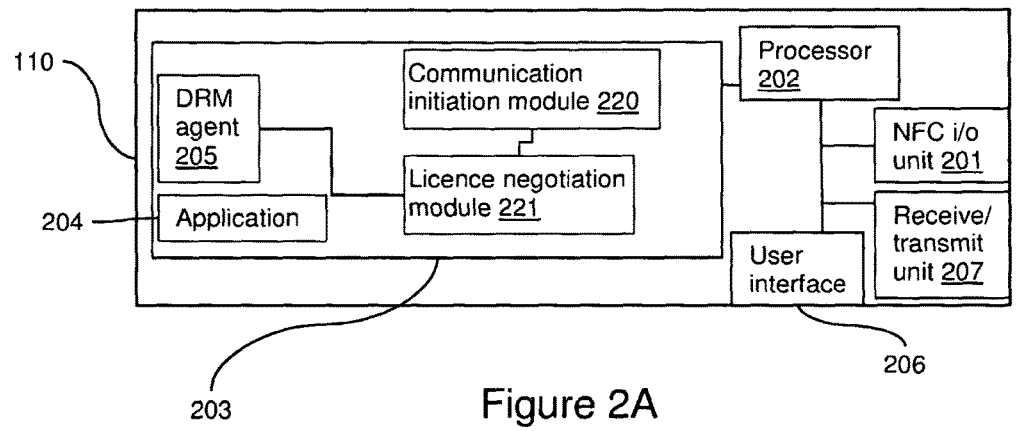
FIG. 2A is a schematic diagram of an NFC-enabled user device.

A schematic diagram of an NFC-enabled user device 110 is shown in FIG. 2A. The user device 110 includes an input/output unit (NFC transmitter/receiver) 201, operatively connected to a processor 202. The processor is connected to a memory 203 into which can be loaded a software application 204 and DRM agent 205. It will be appreciated that in an some implementations the DRM agent may be stored in trusted memory and executer in a trusted environment. The memory 203 may comprise suitable hardware such as ROM, RAM, flash memory, etc. in order to enable the necessary data to be stored and recovered. The memory 203 may include instructions executable by the processor to cause the processor to control the operations of the input/output unit 201 and user interface 206. The memory may include a communication initiation module 220 which includes instructions executable by the processor, when the device comes within a predetermined maximum distance of an NFC pad 104, to establish communications with that NFC pad. The memory may also include a license negotiation module 221 which includes instructions, executable by the processor, for negotiating a license for the application using an authentication of the NFC pad to the license server, as will be described in more detail below. The user device may be a mobile device, in which case it may include an additional receive/transmit unit 207 for exchanging data using another mechanism such as a telecommunications network or Wi-Fi network.

Figure 2B:
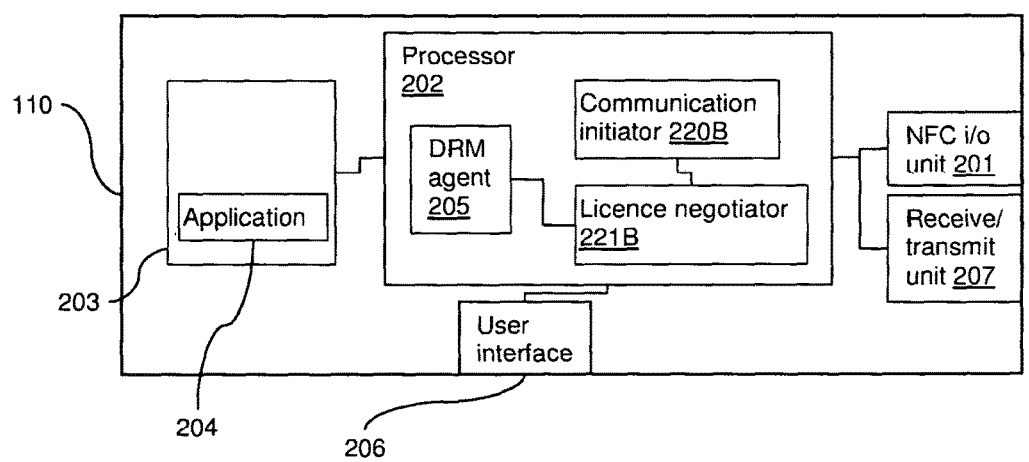
FIG. 2B is a schematic diagram of an alternative implementation of an NFC-enabled user device.

An alternative implementation of the user device is illustrated in FIG. 2B. In this implementation the processor 202 includes a hardware communication initiator 220B that establishes communication with an NFC pad 104 when the user device comes within a predetermined maximum distance of that NFC pad. Once communication has been established a license negotiator 221B negotiates a license using an authentication of the NFC pad to the license server.

The DRM agent 205 may also be provided as a hardware module or saved in trusted memory.

When a user wishes to use a software application 204 that requires a license on his NFC-enabled user device 110, he places the device in close proximity to one of the NFC pads 104 in the premises of the organisation and selects the application to run, either by interacting directly with the device 110 via a user interface 206 or via the screen 109 and keyboard 108 (shown in FIG. 1). Initially a verification is made on the user device as to whether a valid license is present. This verification may be made by the software application 204 itself, or by the DRM agent 205. The DRM agent 205 may already be present on the user device or may be downloaded from the NFC pad 104. In most cases, a valid license is unlikely to be present at this stage, in which case the user device 110 sends a license request message to the network 101, over the NFC connection, for a license to be used during the time the user device 110 is connected to (i.e. in communication range of) the NFC pad. The license request message contains an application ID identifying the application being launched. The license request is routed to the LS 102, which checks the LDB 103 to determine if there are free licenses for the particular application 204 and, if found, a license is reserved for the user device 110 and a confirmation message is sent to the user device 110. The instructions included in the DRM agent 205 will then enable the processor 202 to launch the application 204 as licensed.

To free a license back to the pool for use by other users, the user simply closes the application. During the shutdown phase the user device (typically the DRM agent) sends a notification message to the LS 102 informing it that the license can be freed from reservation. To protect against malicious users the user device (typically DRM agent) may also monitor the connection with the NFC pad 104, and close the application down automatically when NFC communication is lost. Indeed, this may be a constraint property of the license, which may be enforced by the DRM agent. In this situation the LS 102 might not be aware that the application has been closed. A number of alternative are available to address this issue:

1. When the LS 102 receives a license request message for an application for which all licenses are already reserved, it can poll each user recorded as currently operating a license to see if they are still reachable (i.e. still attached to an NFC pad 104-107 and the application 204 is responding). If a user/application is not reachable it means that the user device 110 has been disconnected from the NFC connection, which means that the application has terminated on the user device by the DRM agent 205. The license reserved for that user can then be freed for another user.

2. A user device 110 on which an application 204 is running can poll the LS 102 at regular time intervals to inform it that the application is still running and the license should stay reserved. Once the LS 102 notices that there are no more update messages from the application it can again free the license from reservation.

It will be appreciated that many different arrangements may be envisaged to make this possible. In one embodiment it can be assumed that the LS 102 is a trusted entity. The NFC pads 104-107 may have tamper resistant hardware to protect the keys. A trusted mechanism may exist to share keys between LS 102 and the NFC pads 104-107. Any DRM agent 205 in the user device 110 should have tamper resistant mechanisms to protect keys.

In one possible setup, each NFC pad 104-107 has an identity (e.g., hash of a certificate, public key, hash of a public key) and ways of proving ownership of that identity such as a certificate issued by the LS 102: this requires that secure ways exist to share certificates or shared secret keys between the LS 102 and NFC pads 104-107, as suggested in the previous paragraph. This makes it possible to authenticate license request messages coming from the NFC pads 104-107, and only authorise requests coming from an entity which holds a valid key (i.e. NFC pads unknown to the LS 102 cannot connect to the LS 102). Physical security should be employed to protect the NFC pads 104-107 from tampering such as removal of pad to some other location, key extraction attempts etc.

The license server 102 stores information about keys (symmetric key or certificate) agreed between itself and the NFC pads 104-107. It might also be beneficial for the License server 102, in addition to storing the identities of the authorized NFC pads in a database, to store pad-specific limitations, e.g. some pads might have access to more software than others based on, for example, their location.

At least three alternatives may be considered for the use of the pad:

1) In a first arrangement, the NFC pad 104 actively modifies each packet sent through it towards the LS 102 by adding a digital signature or keyed checksum (e.g., IPSec Authentication Header) to the packet. Effectively, the NFC pad 104 forwards payload received from the user device 110 to the LS 102 and adds a digital signature such as a message digest signed by the private key of the pad. The NFC pad 104 also checks that the signature of packets received from the LS 102 is valid before forwarding them to the user device 110.

2) In a second arrangement, the NFC pad 104 signs each message using a key. This could be a private key or a key shared between the NFC PAD 104 and License Server 102. The signing takes place at an application level compared to the packet level signing in the first arrangement. This enables the NFC pad 104 to make decisions as to whether to pass or block the message based on the information contained therein. For example, the pad could block messages for a certain version of the DRM agent 205 on the user device 110, or block messages for a particular license software request. This requires that at least part of the data in the traffic between the DRM agent 205 in the user device 110 and the LS 102 is unencrypted.

3) In a third arrangement, the NFC pad 104 does not modify the license request message at the packet level or the application level. Instead, it issues a secure token to the user device 110. The DRM agent 205 operating on the user device 110 ensures that this token is included by the user device 110 for all subsequent communication towards the LS 102 so as to prove requests are authenticated by a legitimate NFC pad. To achieve this, a short protocol exchange between the NFC pad 104 and the user device 110 is performed. During this exchange the NFC pad 104 provides its identity to the user device 110 together with a token and an indication of the time for which the token is valid (the token should have a short lifetime). The token should be cryptographically bound to the private key of the NFC pad 104 and should be verifiable by the License server 102. A possible implementation may operate as a hash-chain based solution where a hash is calculated over the previous hash value and the hash value is bound to its lifetime (which corresponds to the lifetime of the token) by signing the combination of the two with the pad's private key. This way it can be proved that the NFC pad 104 has generated the token. This is verifiable using the pad's certificate: the freshness is ensured using a hash chain and lifetime token.

A potential problem with this third approach is that there is no direct way of proving that the traffic originates from the NFC pad 104, since it does not modify the traffic in any way. Thus, it could be feasible for someone to attempt to attach the user device 110 to the network containing the License server 102, try to fake being behind one of the NFC pads 104, and request licenses. This will of course only work within the lifetime of the tokens and as long as no one else connects over the same pad thereby updating the current token. Every time a new connection is made to the NFC pad by a user device, the pad generates the next value in the hash chain and binds it to the lifetime of the token. This means that, once a new user device attaches to the pad, the token provided to the previous user device attached to the pad gets invalidated (as soon as the new user device communicates the new token to the License server). In this case, the License server needs to revoke any previously issued and still valid licenses, if any.

A distance bound check between the user device 110 and the NFC pad 104 can be carried out for any of the arrangements described above. The distance bound check is performed to verify that the attaching device 110 actually is attached directly to the NFC pad 104. A suitable approach (described, for example, in Gerhard P. Hancke and Markus G. Kuhn, An RFID Distance Bounding Protocol, http://www.cl.cam.ac.uk/~mgk25/sc2005-distance.pdf) involves measuring the distance of the two endpoints (pad 104 and NFC user device 110) and comparing the result to some given threshold. The distance is measured in response time which, together with the known delay of the link, can give an estimate of the probability that the user device 110 is actually on the NFC link. The path delay can be determined by measuring the time it takes from sending a request (e.g. echo request) to receiving a response. If the expected path delay for the NFC link is known it can be compared to the measured path delay, so as to confirm that it falls within a given, acceptable, threshold of the expected delay. If the delay is not acceptable then the packets will not be modified (arrangement 1), the messages blocked (arrangement 2) or the token not issued (arrangement 3).

The behaviour of the LS 102 will depend on which arrangement described above is chosen.

1) In the first arrangement the NFC pad 104 signs the packets of all messages passed to the license server 102. In this case the license server 102 can check each incoming packet for a signature by an authorized pad. This effectively eliminates connection attempts by attackers so only connections from valid sources are getting through to the License server.

2) The second arrangement is similar to the first: the LS 102 verifies the signature for each request message.

3) In the third arrangement the license server 102 needs to be aware of the most recent token for each NFC pad 104-107. When a connection attempt is received it will verify the identity of the pad, the lifetime of the token, and the freshness of the token. The LS 102 can check the signature of the token to verify that it is coming from a valid pad, and try to recalculate the hash value by using the previously known hash (token) value and hashing it. It might be that the server needs to calculate multiple new hash values from the hash chain since some hash values might have been un-seen by the License server (if, for example, a user device 110 has obtained a token from an NFC pad 104 but has not yet used it). The LS 102 should store the latest known hash value.

If the signature matches and the token is fresh, the request can be processed as it appears to be coming from a valid pad with a valid token.

The LS 102 can, in each scenario, also carry out distance bounding checks to verify that the NFC pad 104-107 is within the range of its assumed location. In other words, the LS 102 may check that the NFC pad 104-107 has not been removed from the premises to another location by confirming its physical distance from the LS 102 and confirming that this is within an expected range. This distance bounding check can be operated in conjunction with the physical security associated with each NFC pad 104-107 which should prevent its theft.

As previously discussed, the user device 110 has (or downloads) a DRM agent 205 that handles DRM functions. Depending on which of the three arrangements described above is used by the NFC pads 104-107 and license server 102, the user device 110 may communicate with the License server via the NFC pad 104 but without needing to interact directly with the NFC pad (in the first arrangement the pad 104 simply signs all the traffic, and in the second the DRM agent 205 communicates with the License server through the NFC pad). Alternatively (in the third arrangement) the user device 110 performs a registration exchange with the pad 104 during which it receives a signed token from the pad which it then includes in its communication with the License server.

Figure 3A:
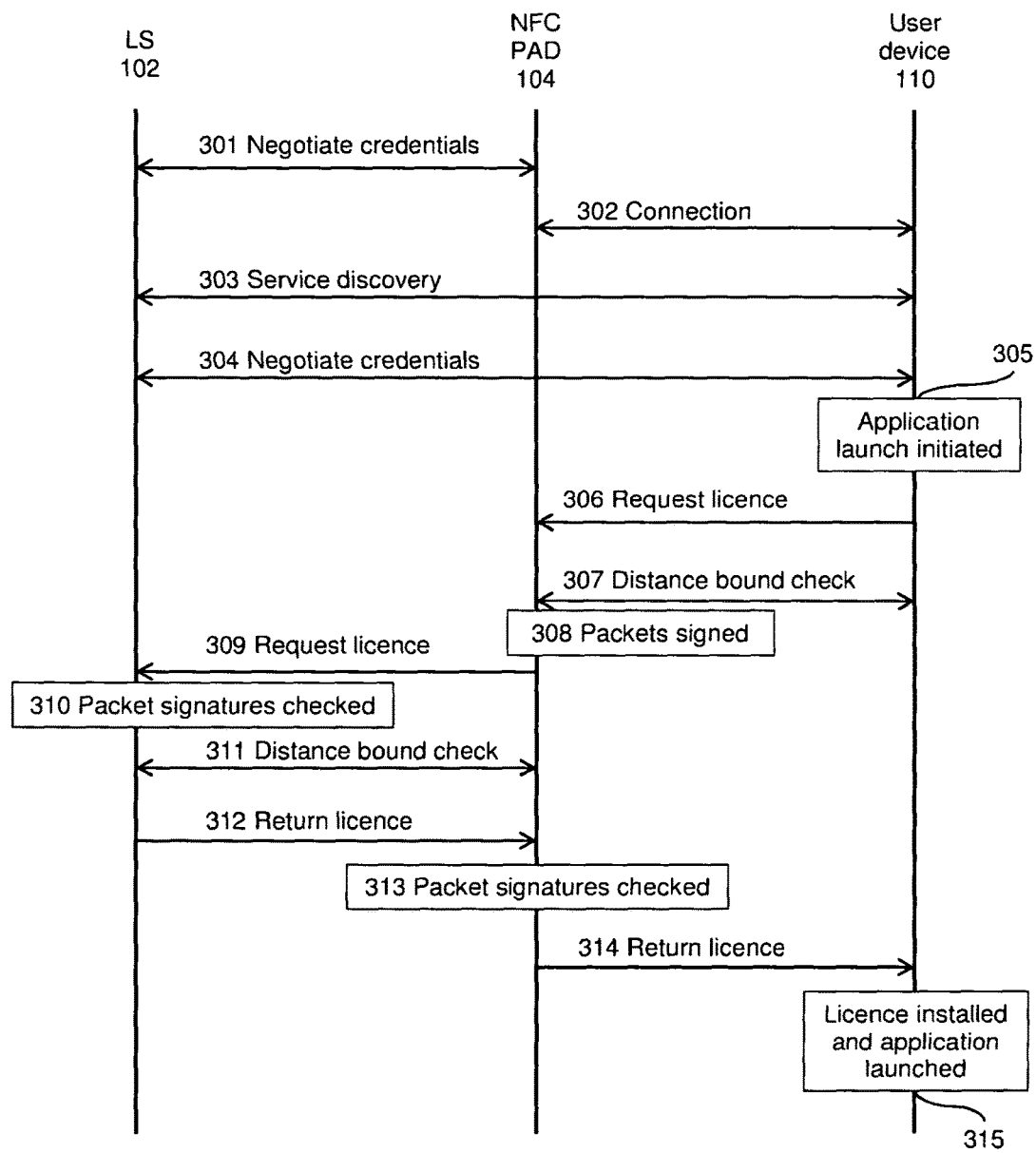
FIGS. 3A, 3B and 3C are signalling diagrams illustrating how the NFC-enabled user device obtains usage rights to operate a software application.
Figure 3B:
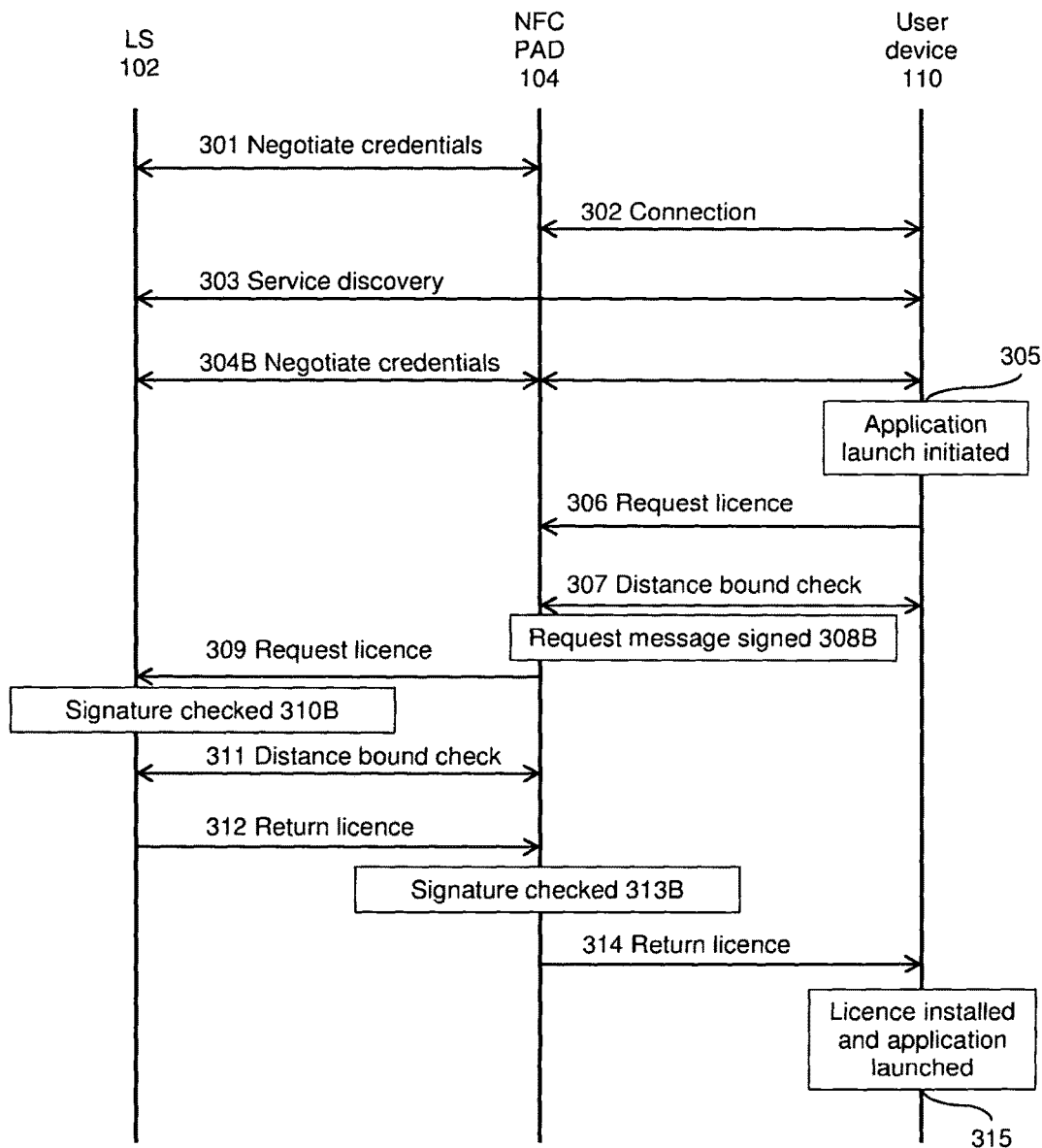
Figure 3C:
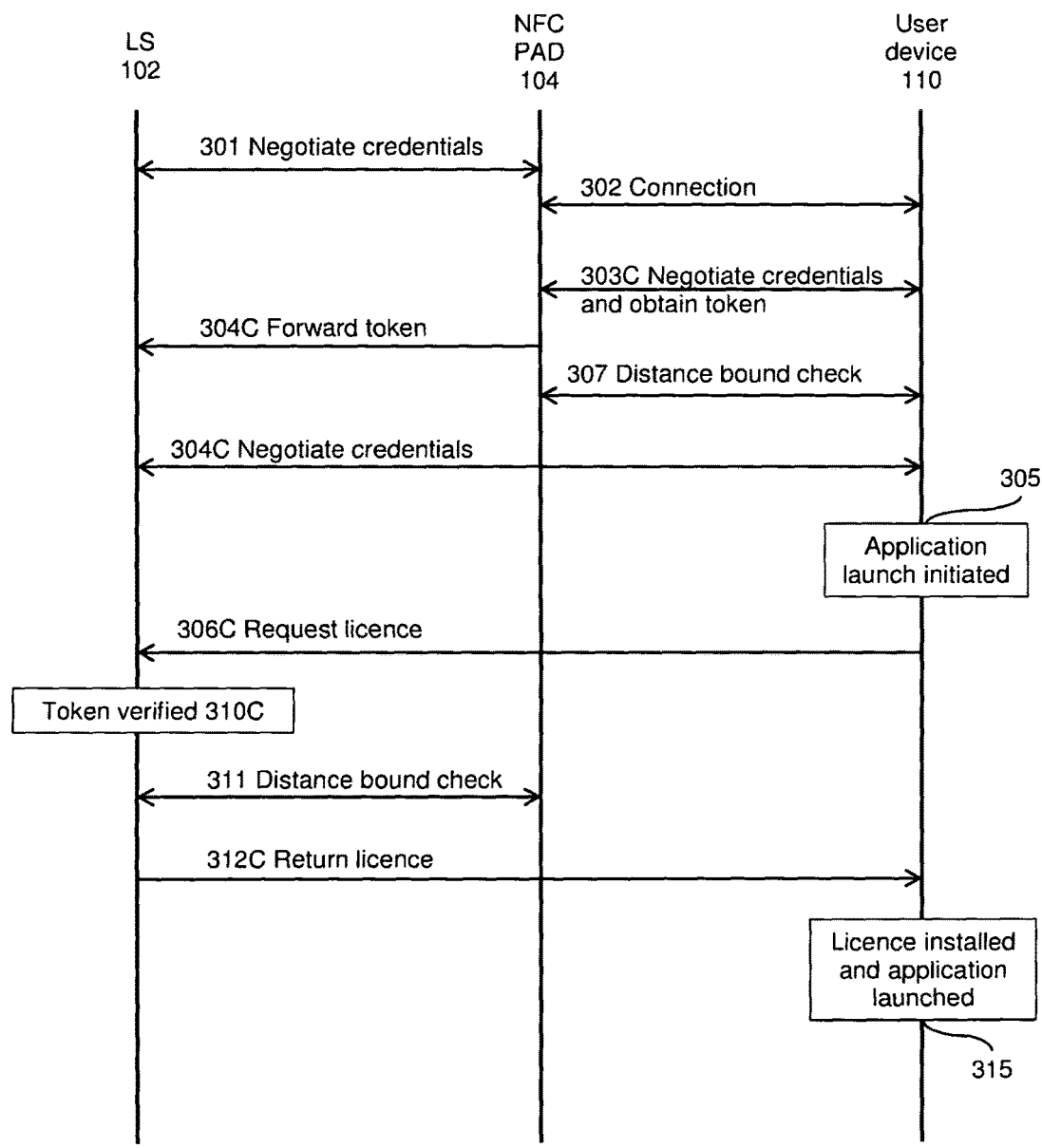

FIGS. 3A, 3B and 3C are signalling diagrams illustrating how the user device 110 obtains usage rights to operate the software application 204 for the three arrangements described above. In each case there is an initial bootstrap phase 301 during which the pads 104-107 are configured with keys and certificates, and the information about these are stored in the LS 102 or in some other server/service that the license server can access. The pads 104-107 establish a secure connection with the license server 102. This could be as a reaction to a user device 110 connecting over NFC, or they could keep a secure session open all the time. This can be done with IKE/IPsec, for example.

In step 302 a connection is established between the user device 110 and NFC pad 104. This connection may be established as a result of the NFC pad 104 acting as an initiator as a result of the user device 110 (target) being placed in close proximity thereto. The DRM agent 205 of user device 110 recognizes the NFC connection and may carry out service discovery 303 to locate license server services in the network. The service discovery of the license server could be any kind of service discovery protocol, e.g. broadcast message, and need not be routed through the NFC pad, although in many implementations the service discover will pass through the NFC pad, although the pad may do no more than forwarding or routing the packets. It will be appreciated that service discovery may not always be necessary: information about available license servers may be communicated to the user device 110 by the NFC pad 104 following step 302.

Considering now the first scenario shown in FIG. 3A, in step 304 the DRM agent 205 establishes a secure communication channel with the license server 102. This can be done, for example, using OMA DRM (ROAP) 4-pass Registration Protocol, as described in http://xml.coverpages.org/OMADRMv204-20040420.pdf.

Remaining for the moment with the first scenario in FIG. 3A, In step 305 the user initiates the launch of a software application 204 on the user device 110. The DRM agent 205 is alerted to handle the licensing of the application 204. The DRM agent 205 requests a license (known as a Rights Object in OMA DRM), in step 306. If OMA DRM is used, this may be done using the 2-pass Rights Object Acquisition Protocol. The NFC pad 104 carries out a distance bound check 307, and if this is passed then the packets of the license request are signed 308 and passed on 309 by the NFC pad 104 to the LS 102. Alternatively, the distance bound check (if done) could be done once the user device 110 starts negotiating with the license server 102. The fact that the distance bound check has been carried out may be communicated to the LS at the same time as the license request 309 is sent to the LS 102.

After verifying the packets 310 the license server 102 allocates a free license for the selected software (if available, otherwise an error code is returned indicating no free licenses) and returns the license towards the NFC pad 104 in step 312. A further distance bound check 311 may be carried out first. The further distance bound check 311 is a way of ensuring that the NFC pad 104 has not been moved from its intended location (e.g. to a user's home) as compared with the first distance bound check 307 which checks that the user device 110 really is close to the NFC pad 104. The NFC pad 104 checks the signature of the packets returned from the LS 102 (step 313) and forwards the license towards the user device 110 in step 314. The license terms are defined in the rule set (e.g., who can use the license, for what time). The DRM agent 205 will respect the rule set defined by the license server 102.

The DRM agent 205 then installs the received license and lets the application launch 315.

FIG. 3B illustrates the steps involved when the second arrangement is used. This is similar to the arrangement used for the first scenario, but in this case the step 304B of negotiating credentials between the user device 110 and LS 102 involves the negotiation messages being intercepted by the NFC pad 104. This is because, in this arrangement, the user device only has knowledge about the NFC pad. The NFC pad acts as an application level proxy routing the user request. The NFC pad, being an application level proxy, can decide which request to pass and which one to block based on application level content.

Once credentials have been established, the user initiates launch of a software application 204 in step 305 in the same way as in the first scenario. The DRM agent 205 requests a license in step 306. This message is received by the NFC pad 104 which may carry out a distance bound check 307. If this check is accepted, and if all other required criteria are met (e.g. the correct version of the DRM agent 205 is operating on the user device 110), then the NFC pad 104 signs the license request message 308B and forwards the signed message 309 to the LS 102.

The LS 102 checks that the signature is correct 310B, carries out a distance bound check 311 and returns the license to the NFC pad 104 in step 312. The NFC pad checks the signature of the license 313B and passes the license on to the user device 110 in step 314. The license is installed and the application launched in step 315.

In the third arrangement, shown in FIG. 3C, the process starts in the same way as the previous two with a bootstrap phase 301 and the connection 302 of the user device 110 to the NFC pad 104. The user device 110 then registers with the connected NFC pad 104 and receives 303C a signed token from the pad. The NFC pad can optionally perform a distance bounding check 307 to ensure the distance between the NFC pad and user device: in one alternative this may be completed before the token is provided to the user device 110.

The token and its signature should also be communicated to the License server 304C, although this could alternatively be done during the bootstrap phase 301. Once the launch of the application has been initiated 305 by the user, the user device 110 requests the license 306C directly from the LS 102. This may be done by communication via the NFC pad 104 (i.e. the pad simply forwards packets from the user device 110 towards the LS 102) or via a separate communication mechanism such as a telecommunications network.

The token is verified in by the LS 102 in step 310C and a distance bound check to the NFC pad may be carried out. If each executed test is passed then the license is returned to the user device 110 in step 312C and installed in step 315.

The behaviour of the DRM agent 205 is worthy of further discussion. The DRM agent reacts to NFC attach messages, possibly by querying the NFC pad 104 for license server service information (e.g. IP address) or by carrying out other forms of service discovery. It might also perform registration to the license server 102 as soon as it obtains knowledge about it. Otherwise this is done once an application is launched that requires a license from the License server. Furthermore, in the first two alternatives described above, when the DRM agent notices that the NFC connection with the NFC pad 104 is lost it invalidates all licenses installed over the NFC connection. Alternatively, the licenses can be given short lifetimes, in which case the DRM may allow them to run for a while after the NFC is disconnected. In this case the licenses are freed in the License server once the allocated lifetime is reached and the user device has not renewed the license. If an application is closed while the NFC connection is still available, the DRM agent 205 signals to the License server that the license has been released back to the license server 102. In addition, the license server 102 might "ping" the DRM agent at regular intervals to ensure that it is still connected (or perform distance bounding checks), and once the connection is lost the license(s) provided to the DRM agent can be released since the licenses do not stay valid in the user device once the NFC connection is broken. Alternatively, the DRM agent could be the one sending keep-alive messages towards the License server.

Figure 4:
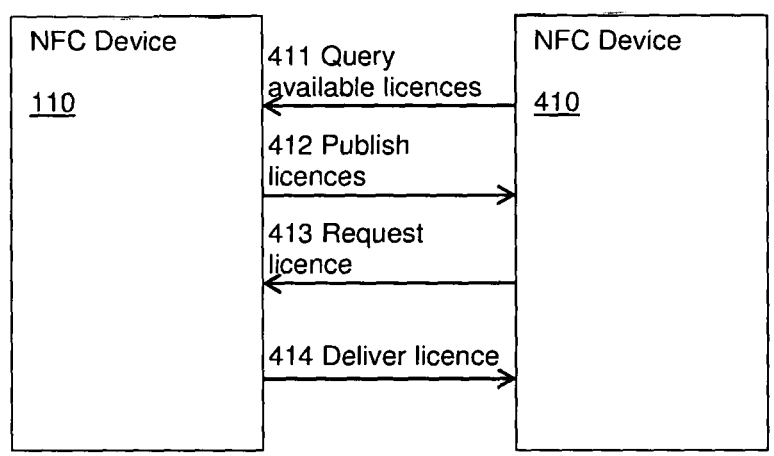
FIG. 4 is a schematic diagram illustrating the distribution of licenses to further NFC-enabled user devices.

The general approach can also be extended to enable users to delegate their license while offline. Suppose the user device 110 has obtained a license for a particular software application, as described above. This license could then be shared with (or delegated to) another NFC enabled device without an active communication to the license server. This approach is appropriate if the license server is offline or two contacting devices have no connectivity with the license server. This scenario is also valid in a setting without any LS; it might be that an application has a license to run on one user device, but the license specifies that the license can be moved between devices (often of the same user) using NFC. The options available are controlled by the DRM agent. In addition, the licensing term should include delegation permission. A suitable general approach to enable this is shown in FIG. 4, in which a second user device 410 requests that the first NFC license is passed to it.

We assume that the first user device 110 has already one or several software licenses for different applications. These applications have an equivalent on the second user device 410, and thus the same license applies. In such a situation, the devices carry out a handshake procedure to authenticate each other. Then the second device 410 queries available licenses 411 from the first user device, the first user device 110 publishes the licenses it holds 412, the second device 410 requests one of these licenses 413, and the first user device 110 delivers the requested license 414 to the second user device 410.

The scenario can be extended for cases in which the first user device 110 acts as a license database storing series of licenses. As an example, the first device 110 can act as a provisioning tool to distribute licenses to n other devices using NFC. After provisioning, the original record of the license information can be sent to the LS 102 either by the first device 110, or one of the other devices.

In this approach, the license-provisioning device can set a location itself. This enables the first device 110 to download more than one license when connected to the NFC pad 104. These licenses can then be distributed to other devices which connect to this first device, which means these other devices need not be in a specified location to receive their licenses. To maintain location conformity, the registration request to LS must include a signature provided by the provisioning User device. Devices can unregister once the license expires (time dependent license) or a de-provisioning User device can explicitly unregister the license.

This can be used to provision licenses in remote locations or in sensor devices. For example, if sensors are in a remote location and lacking connectivity with a licensing server, a temporary license store in the form of a user device 1 can be used to obtain the licenses from the LS 102 and then provision the licenses to the other devices (sensors). Similar approaches can be used to provision licenses for devices in Delay Tolerant Networks (DTN).

Figure 5A:
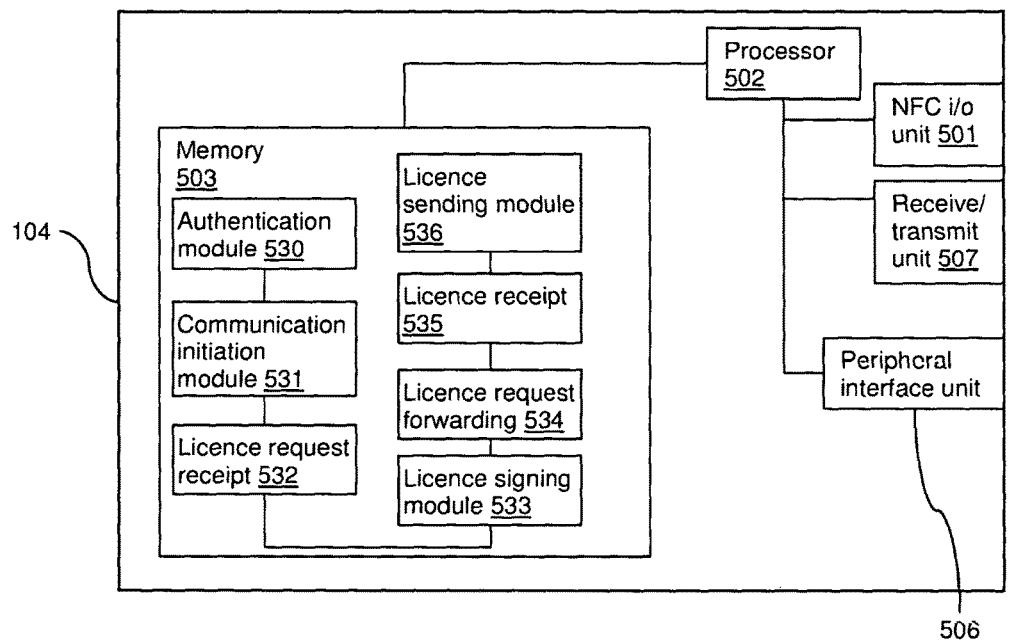
FIGS. 5A to 5D are schematic diagrams illustrating some of the structure of alternative implementations of an NFC pad.

FIG. 5A is a schematic diagram illustrating some of the structure of one implementation of a local interface device (NFC pad) 104. The pad 104 includes an NFC input/output unit 501 for communicating with user devices 110, a peripheral interface unit 506 for communicating with peripherals such as a keyboard 108 and monitor 109, and a receive/transmit unit 507 for communicating with the LS 102. All of these units are controlled by a processor 502 connected to a memory 503. The memory contains instructions executable by the processor for the processor to control the operation of the input/output unit, receive/transmit unit and peripheral interface unit. In particular the memory includes an authentication module 530 including instructions for negotiating credentials with the license server 102, a communication initiation module 531 for initiating communication with a user device 110 when the user device is placed close to the local interface device 104, a license request receipt module 532 for receiving a license request from the user device, a license signing module 533 for signing the license request using the authentication to the license server, a license request forwarding module 534 for sending the signed license request to the license server, a license receiving module 535 for receiving a license from the license server, and a license sending module 536 for sending the license to the user device 110.

Figure 5B:
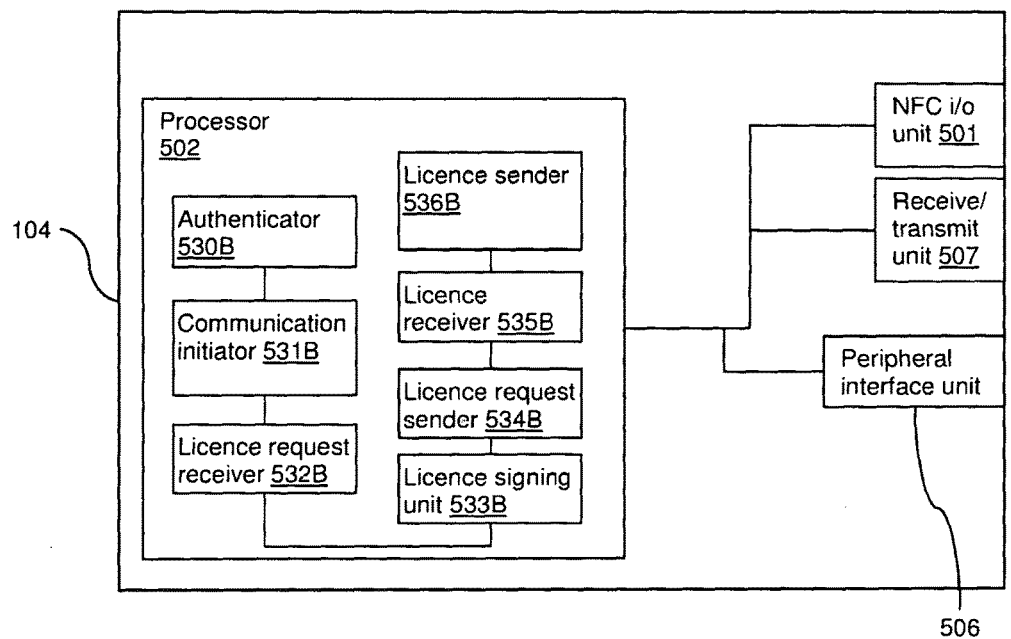

An alternative implementation is shown in FIG. 5B, in which the software modules of FIG. 5A are replaced by hardware units in the processor 502, including an authenticator 530B, communication initiator 531B, license request receiver 532B, license signing unit 533B, license request sender 534B, license receiver 535B and license sender 536B.

Figure 5C:
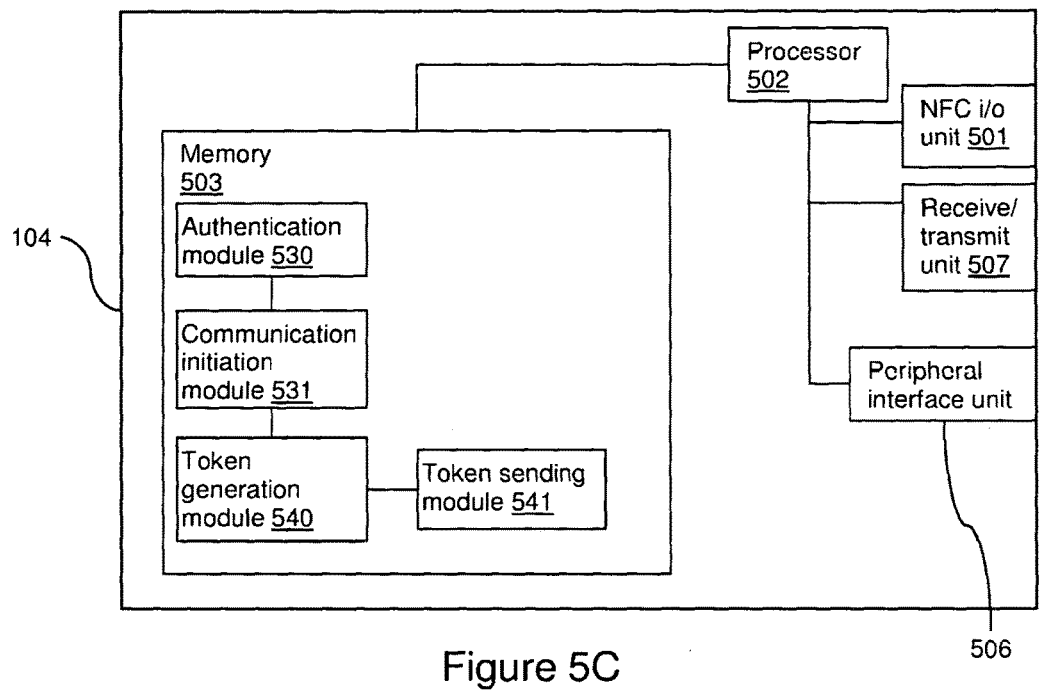

FIG. 5C shows a further alternative implementation of the user device 104, in which the memory 503 includes modules 540, 541 containing instructions to generate a token and forward it to the user device 110 instead of processing a license request message on behalf of the user device.

Figure 5D:
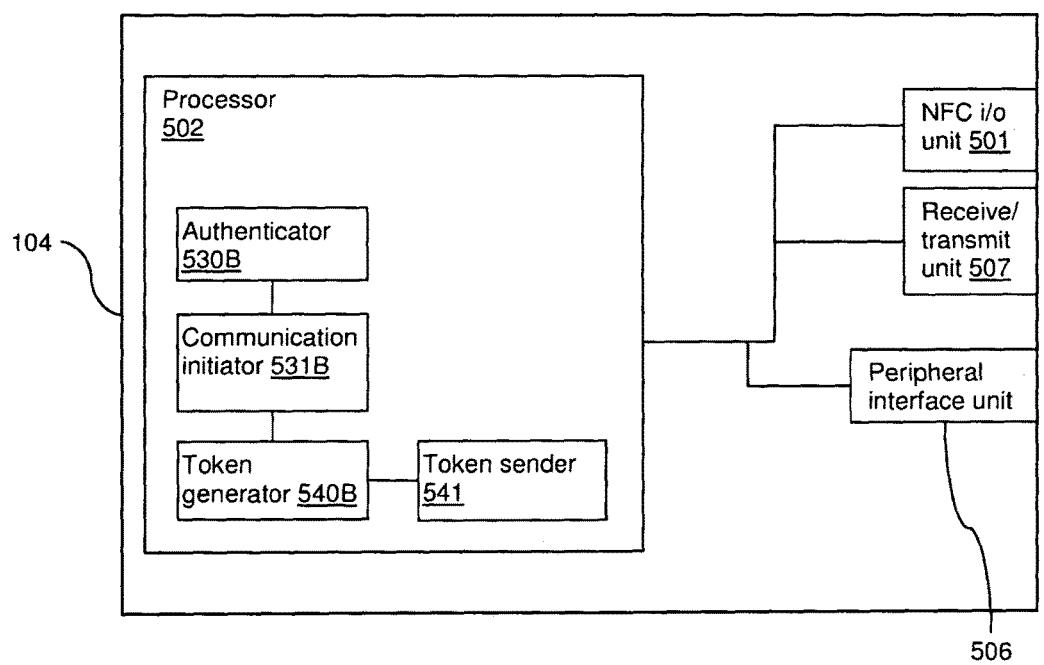

FIG. 5D illustrates an implementation similar to that of FIG. 5C in which the processor includes hardware modules 540D, 541D for generating and sending the token.

Figure 6A:
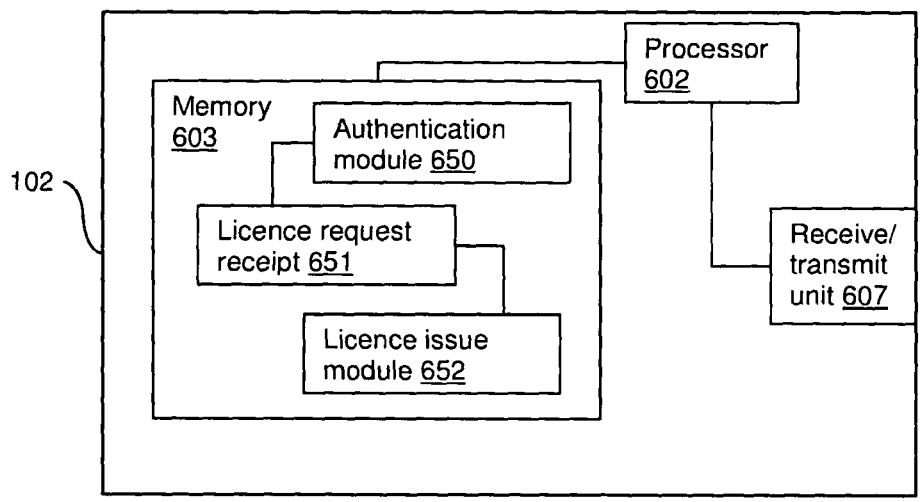
FIGS. 6A and 6B are schematic diagrams illustrating some of the structure of alternative implementations of a license server.

FIG. 6A is a schematic diagram illustrating some of the structure of one implementation of a license server 102. The LS 102 includes a processor 602, memory 603 and receive/transmit unit 607 for communicating with an NFC pad 104-107 and license database 103. The memory 603 includes instructions executable by the processor to operate the receive/transmit unit 607, and further includes an authentication module 650 having instructions causing the processor to negotiate with an NFC pad 104 at a known location so as to authenticate that NFC pad, and a license request receipt module 651 to receive a license request message including some indication that it has been authorised by the authenticated NFC pad 104. This indication may include a token issued by the NFC pad 104, or the fact that the license request message has been signed by the NFC pad. If the license request message is acceptable (and there are licenses available) a license issue module 652 contains instructions to issue a license towards the user device.

Figure 6B:
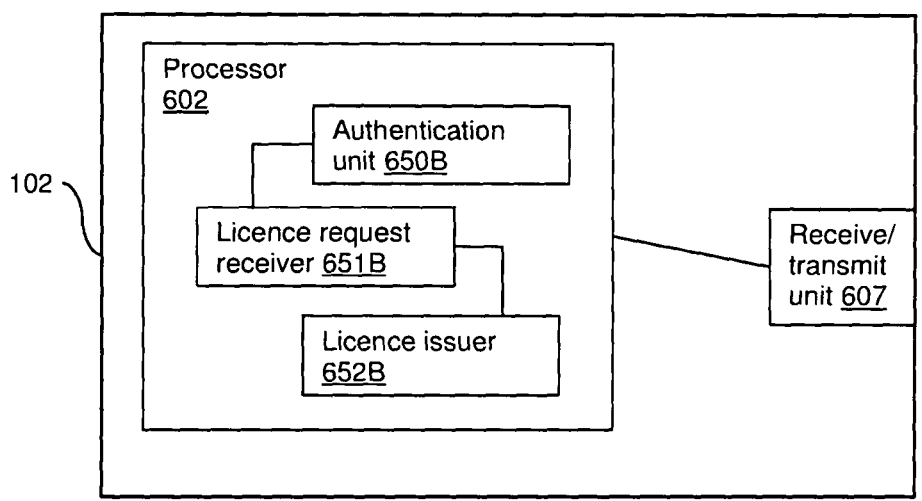

FIG. 6B illustrates an alternative implementation of the license server 102, in which the software modules described above have been replaced by hardware modules 650B, 651B, 652B.

Figure 7:
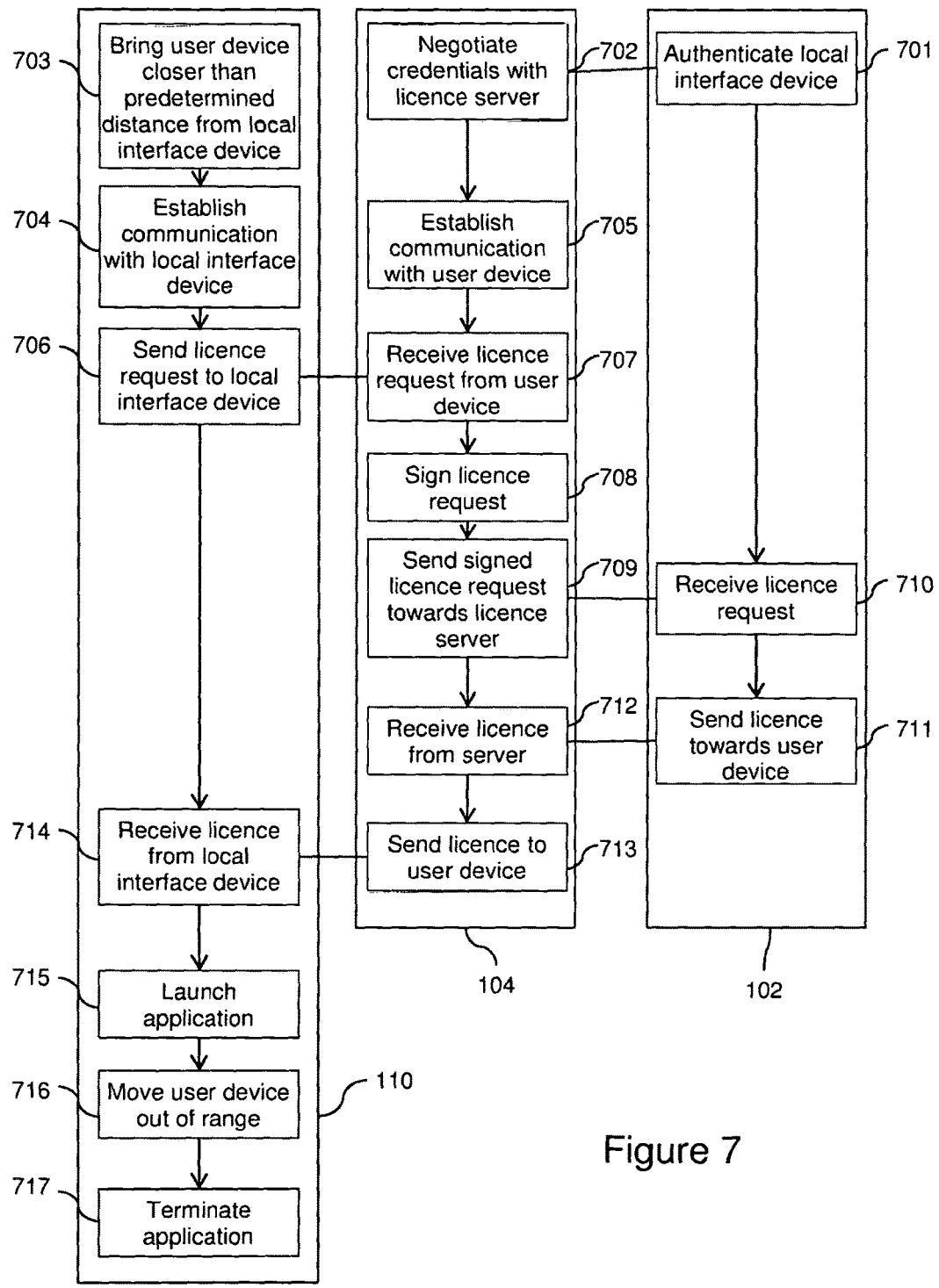
FIG. 7 illustrates steps which may be carried out by a user device, a local interface device, and an LS in accordance with various aspects as described herein.

FIG. 7 includes three flow charts illustrating the steps which may be carried out by the user device 110, local interface device (NFC pad) 104 and LS 102 in the first two implementations described above. The LS 102 authenticates the local interface device 104 in steps 701, 702. When the user device 110 is brought close 703 to the local interface device 104, communication is established between the two 704, 705. This may be done using the input/output unit 201 of the user device 110 communicating with the input/output unit 501 of the local interface device 104. A license request message 706 is sent from the user device 110 via the input/output module 201 and received 707 by the local interface device 104 via the input/output unit 501. The license request message is signed 708 by the processor 502 of local interface device 104 and sent 700 to the LS 102 using the receive/transmit unit 507. The LS 102 receives the license request message 710 via the receive/transmit unit 607. The processor 602 establishes that a license is available and sends it 711 towards the user device 110 via the receive/transmit unit 607. The license is received 712 by the local interface device 104 and sent to the user device 104 using the receive/transmit unit 507 and input/output unit 501. The user device receives the license 714 via the input/output unit 201 and the processor launches the application 715. If the user device 110 moves out of range 716 of the local interface device 104 then the processor 202 may terminate the application. In an alternative implementation the processor (or DRM agent) may let the application run until the lifetime of the license is reached.

Figure 8:
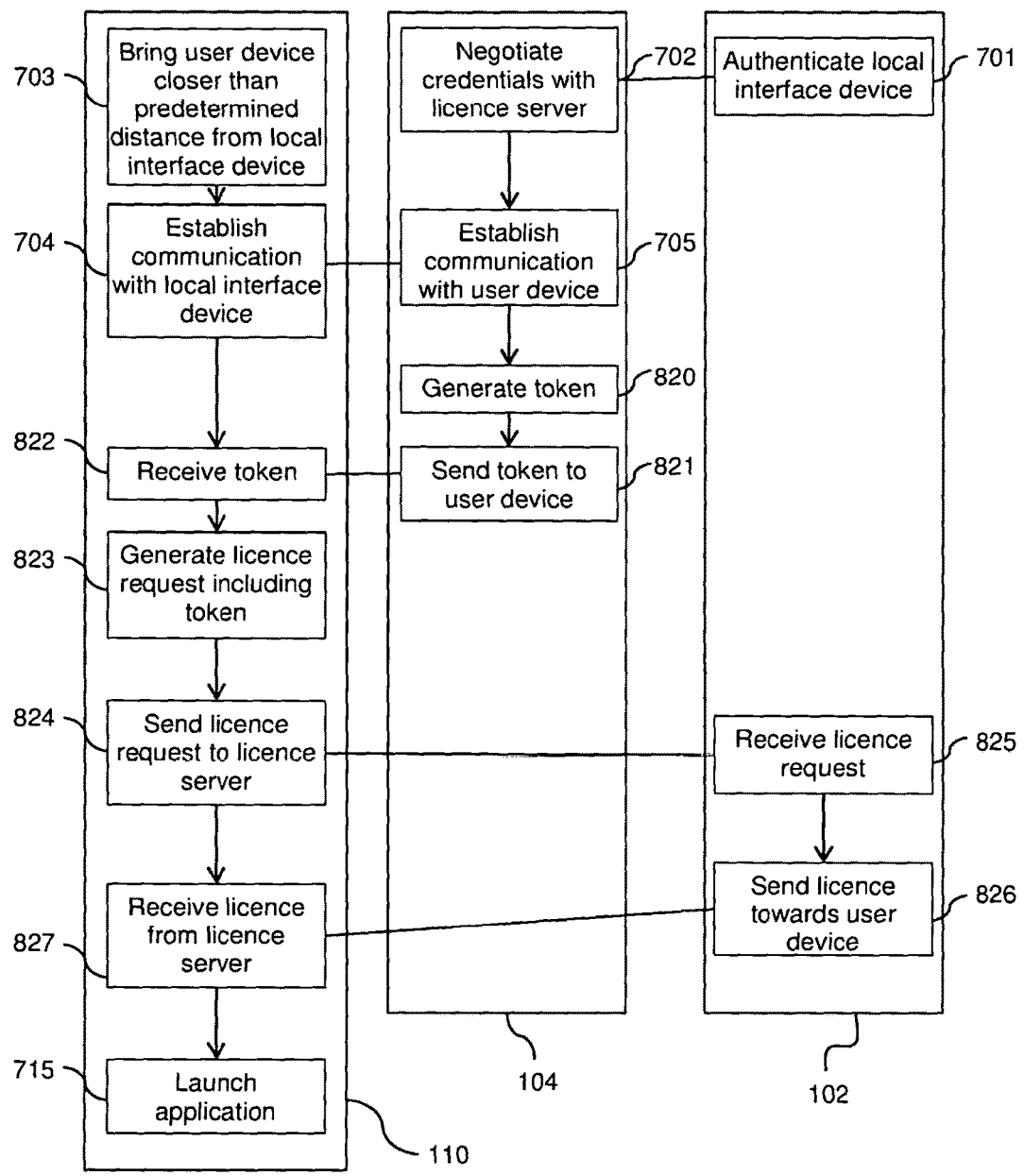
FIG. 8 illustrates steps which may be carried by a user device, a local interface device, and an LS in accordance with various aspects as described herein.

FIG. 8 illustrates the steps involved by the user device 110, local interface device 104 and LS 102 in the third implementation described above. Many of the steps are the same as those of FIG. 7 and are shown with the same reference numerals. FIG. 8 differs from FIG. 7 in that, once communication has been established between the user device 110 and local interface device 104, the processor 502 of the local interface device 104 generates a token 821 and sends it to the user device 110 via the input/output unit 501. The user device receives the token 822 via the input/output unit 201 and the processor 202 uses it to generate a license request 823. The license request is sent to the license server 102 in step 824 via the receive/transmit unit 207. The license server receives the request including the token 825 and sends a license 826 towards the user device 110. The user device receives the license 827 and the processor 202 launches the application 715, under the control of the DRM agent.

The arrangements described above enable users to utilize their own device to access licensed software, where the license for the software is provided by some service provider. Licenses may be valid for a limited time. After the user finishes using the application licenses may be released for other users. The use of the license is bound to the user's physical location. The user can only access the license when within the area defined by the service provider. This area is thus defined by the places where the NFC pads are located.

It will be appreciated that variations from the above described embodiments may still fall within the scope of the invention. For example, the embodiments described above assume the use of NFC, but any short range data exchange system such as Bluetooth® that fixes the location of the user device close to the pad would be appropriate. Other forms of local interface device may be used: the NFC pad is just one example. It may also be envisaged that the user device may be plugged into the NFC pad (or other local interface unit) directly rather than relying on a wireless interface.

The invention claimed is:

1. A system for a license provider to distribute licenses for software applications, the system comprising:
   a license server operated by the license provider for distributing licenses to user devices;
   at least one local interface device at a geographical location, the local interface device having a receive/transmit circuit and an input/output circuit, the local interface device configured to:
   communicate, via the receive/transmit circuit, with the license server;
   communicate, via the input/output circuit, with a user device when the user device is located less than a predetermined maximum distance from the local interface device; and
   be authenticated to the license server; and
   wherein the at least one local interface device provides a mechanism, limited to user devices communicating with the local interface device when located less than the predetermined maximum distance from the at least one local interface device, for a user device to use the authentication of the local interface device to obtain a license from the license server.

2. The system of claim 1, wherein the input/output circuit is a short range wireless communication system transmit/receive circuit.

3. The system of claim 2, wherein the short range wireless communications system transmit/receive circuit is a Near Field Communication (NFC) transmit/receive circuit.

4. The system of claim 1, wherein the user device includes a Digital Rights Management (DRM) agent for negotiating the provision of the license with the license server and controlling operation of a software application under the license.

5. The system of claim 4, wherein the DRM agent is configured to terminate use of the application when the user device moves away from the local interface device by more than the predetermined distance.

6. The system of claim 4, wherein:
   the license has a lifetime; and
   the DRM agent is configured to terminate use of the application when the lifetime has expired.

7. A user device for operating a software application under a license obtained from a license provider, the user device comprising:
a processing circuit;
memory containing instructions executable by the processing circuit to cause the processing circuit to:
exchange data, via an input/output circuit operably connected to the processing circuit, with a local interface device at a geographical location when the user device is located less than a predetermined maximum distance from the local interface device;
negotiate provision of the license from a license server maintained by the license provider by exchanging data, via a receive/transmit circuit, with the local interface device so as to make use of an authentication of the local interface device to the license server, wherein use of the authentication of the local interface device to obtain a license from the license server is limited to user devices communicating with the local interface device when located less than the predetermined maximum distance from the local interface device; and
execute the software application under the license under the control of a Digital Rights Management (DRM) agent.

8. The user device of claim 7, wherein the input/output circuit is a short range wireless communications system transmit/receive circuit.

9. The user device of claim 8, wherein:
the short range wireless communications system transmit/receive circuit is a Near Field Communication (NFC) circuit; and
the local interface device is an NFC pad so that the predetermined maximum distance is determined by the range of an NFC signal between the user device and the NFC pad.

10. The user device of claim 7, wherein the DRM agent is configured to cause the processing circuit to:
send a license request message, intended for the license server, to the local interface device;
receive the license back from the local interface device;
launch the application following receipt of the license.

11. The user device of claim 10, wherein the DRM agent is configured to cause the processing circuit to terminate operation of the application if the user device is moved further than the predetermined distance from the local interface device.

12. The user device of claim 8, wherein the DRM agent is configured to cause the processing circuit to:
receive a token from the local interface device;
send a license request message towards the license server, the license request message including the token;
receive the license from the license server; and
launch the application.

13. The user device of claim 12, wherein:
the license has a lifetime; and
the DRM agent is configured to cause the processing circuit to terminate use of the application when the lifetime has expired.

14. The user device of claim 8, wherein the DRM agent is configured to cause the processing circuit to send an application closed message towards the license server if the application is closed by the user, the application closed message including an identification of the license.

15. The user device of claim 8, wherein the DRM agent is preloaded on the device.

16. The user device of claim 8, wherein the user device is configured to download the DRM agent via the local interface device.

17. The user device of claim 8, wherein the user device is configured to delegate an obtained license to a further user device upon request.

18. A local interface device in a network for distributing licenses for software applications, comprising:
a processing circuit;
memory containing instructions executable by the processing circuit to cause the processing circuit to:
exchange data, via an input/output circuit, with a user device when the user device is less than a predetermined maximum distance from the local interface device;
communicate, via a receive/transmit circuit, with a license server in the network; and
authenticate the local interface device to the license server for receipt of licenses and to provide a mechanism, wherein use of the authentication of the local interface device to obtain a license from the license server is limited to user devices communicating with the local interface device when located less than the predetermined maximum distance from the local interface device for using that authentication to enable the user device to obtain a license.

19. The local interface device of claim 18, wherein the input/output circuit is a short range wireless communications system transmit/receive circuit so that the predetermined maximum distance is determined by the signal range of the short range wireless communications system.

20. The local interface device of claim 19, wherein the short range wireless communications system is Near Field Communication (NFC).

21. The local interface device of claim 18, wherein the processing circuit is configured to:
receive data packets forming a license request message from the user device via the input/output circuit;
sign each packet to confirm to the license server that it has passed through the local interface device;
send the signed packets through the network towards the license server via the receive/transmit circuit;
receive signed data packets forming a license from the license server license server via the receive/transmit circuit; and
send the packets forming the license to the user device via the input/output circuit.

22. The local interface device of claim 18, wherein the processing circuit is configured to:
receive a license request message from the user device via the input/output circuit;
sign the license request message to confirm to the license server that it has passed through the local interface device;
send the signed license request message through the network towards the license server via the receive/transmit circuit;
receive a license from the license server license server via the receive/transmit circuit; and
send the license to the user device via the input/output circuit.

23. The local interface device of claim 22, wherein the processing circuit is configured to choose whether to block or to forward the license request message based on information contained therein.

24. The local interface device of claim 18, wherein the local interface device is configured to send an application closed message towards the license server if the application is closed on the user device or if the user device is moved further than the predetermined distance from the local interface device, the application closed message including an identification of the license.

25. The local interface device of claim 18, wherein the processing circuit is configured to:
generate a token verifiable by the license server and usable by the user device to include in a license request message to the license server; and
send the token to the user device via the input/output device.

26. The local interface device of claim 25, wherein the token is cryptographically bound to a private key of the local interface device.

27. The local interface device of claim 25, wherein the processing circuit is configured to, in response to a subsequent user device connecting to the local interface device, generate a new token and send a token cancellation message to the license server invalidating the previous token.

28. The local interface device of claim 21, wherein the processing circuit is configured to carry out a distance bound check to confirm that the user device is within the predetermined maximum distance before forwarding the signed packets or license request to the license server or forwarding the token to the user device.

29. The local interface device of claim 21, further comprising a peripheral interface circuit for connection to peripheral user interface devices for use by a user when the user device is connected to the local interface device.

30. A license server for distributing licenses for software applications to user devices, comprising:
a processing circuit;
memory containing instructions executable by the processing circuit to cause the processing circuit to:
communicate, via a receive/transmit circuit, with at least one local interface device at a geographical location, and/or with at least one user device;
authenticate the local interface device;
receive a license request message including an identifier or signature of the authenticated local interface device; and
issue a license towards the user device on the basis of the authentication of the local interface device, wherein use of the authentication of the local interface device to obtain a license from the license server is limited to user devices communicating with the local interface device when located less than a predetermined maximum distance from the local interface device.

31. The license server of claim 30, wherein the license server is configured to:
receive an application closed message from the user device or local interface device, the application closed message identifying that the license is no longer in use; and
increase a tally of available licenses as a result of the license no longer being in use.

32. A method of operating a software application on a user device under a license obtained from a license provider, the method comprising:
establishing communication with a local interface device at a geographical location when the user device is located less than a predetermined maximum distance from the local interface device;
negotiating provision of the license from a license server maintained by the license provider by using the communication with the local interface device and an authentication of the local interface device to the license server, wherein use of the authentication of the local interface device to obtain a license from the license server is limited to user devices communicating with the local interface device when located less than the predetermined maximum distance from the local interface device.

33. The method of claim 32, further comprising:
sending a license request message from the user device to the local interface device to be forwarded towards the license server using the authentication of the local interface device at the license server; and
receiving the license from the local interface device.

34. The method of claim 33, further comprising terminating the application at the user device if the user device is moved more than the predetermined maximum distance away from the local interface device.

35. The method of claim 32, further comprising:
receiving from the local interface device a token containing an identifier of the local interface device;
generating a license request message including the token; and
sending the license request message from the user device towards the license server.

36. The method of claim 35, wherein the license is time-limited.

37. The method of claim 32, wherein the user device communicates with the local interface device using Near Field Communication (NFC) so that the predetermined maximum distance is determined by the range of NFC signals.

38. A method of using a local interface device in the distribution of licenses for a software application in a network, the method comprising:
locating the local interface device at a geographical location;
negotiating credentials with a license server so as to authenticate the local interface device to the license server;
establishing communication with a user device when the user device is less than a predetermined maximum distance from the local interface device;
receiving a license request message from the user device;
signing the license request message or data packets forming the license request message;
forwarding the signed license request message towards a license server in the network as a request for the license server to issue a license towards the user device on the basis of the authentication of the local interface device, wherein use of the authentication of the local interface device to obtain a license from the license server is limited to user devices communicating with the local interface device when located less than a predetermined maximum distance from the local interface device;
receiving a signed license from the license server; and
sending the license to the user device.

39. The method of claim 38, further comprising carrying out a distance bound check to confirm that the user device is within the predetermined maximum distance before forwarding the signed license request message to the license server.

40. A method of using a local interface device in the distribution of licenses for a software application in a network, the method comprising:
locating the local interface device at a geographical location;

negotiating credentials with a license server so as to authenticate the local interface device to the license server;

establishing communication with a user device when the user device is less than a predetermined maximum distance from the local interface device;

generating a token verifiable by a license server in the network and usable by the user device to include in a license request that requests a license from the license server on the basis of the authentication of the local interface device, wherein use of the authentication of the local interface device to obtain a license from the license server is limited to user devices communicating with the local interface device when located less than the predetermined maximum distance from the local interface device; and sending the token to the user device.

41. The method of claim 40, further comprising, upon establishing communication with a subsequent user device:

generating a new token;

sending the new token to the subsequent user device; and sending a token cancellation message to the license server invalidating the previous token.

42. The method of claim 41, further comprising carrying out a distance bound check to confirm that the user device is within the predetermined maximum distance before forwarding the token to the user device.

43. A method of distributing licenses for software applications from a license server, the method comprising:

authenticating a local interface device at a geographical location;

receiving a license request message including an identifier of the authenticated local interface device; and issuing a license towards a user device located less than a predetermined distance from the local interface device, on the basis of the authentication of the local interface device, wherein use of the authentication of the local interface device to obtain a license from the license server is limited to user devices communicating with the local interface device when located less than the predetermined maximum distance from the local interface device.

44. The method of claim 43, further comprising maintaining a license database, and only issuing the license if not all of the licenses are in use by other user devices.

45. A method of distributing licenses for software applications, the method comprising:

authenticating at least one local interface device to a license server, the local interface device being at a geographical location;

establishing communication between the local interface device and a user device when the user device is less than a predetermined maximum distance from the local interface device;

receiving a license request message at the license server based on the authentication of the local interface device, wherein use of the authentication of the local interface device to obtain a license from the license server is limited to user devices communicating with the local interface device when located less than the predetermined maximum distance from the local interface device;

if the authentication is correct, sending a license from the license server towards the user device; and receiving the license at the user device and operating an application under the received license.

46. A computer program product stored in a non-transitory computer readable medium for operating a software application under a license obtained from a license provider, the computer program product comprising software instructions which, when run on a processing circuit of a user device, causes the user device to:

exchange data with a local interface device at a geographical location when the user device is located less than a predetermined maximum distance from the local interface device;

negotiate provision of the license from a license server maintained by the license provider by exchanging data with the local interface device so as to make use of an authentication of the local interface device to the license server, wherein use of the authentication of the local interface device to obtain a license from the license server is limited to user devices communicating with the local interface device when located less than the predetermined maximum distance from the local interface device; and execute the software application under the license under the control of a Digital Rights Management (DRM) agent.

47. A computer program product stored in a non-transitory computer readable medium for distributing licenses for software applications, the computer program product comprising software instructions which, when run on a processing circuit of a local interface device in a network, causes the local interface device to:

exchange data with a user device when the user device is less than a predetermined maximum distance from the local interface device;

communicate with a license server in the network; and authenticate the local interface device to the license server for receipt of licenses and to provide a mechanism, wherein use of the authentication of the local interface device to obtain a license from the license server is limited to user devices communicating with the local interface device when located less than the predetermined maximum distance from the local interface device, for using that authentication to enable the user device to obtain a license.

48. The method of claim 1, wherein the local interface device is further configured to determine that the user device is located less than the predetermined maximum distance from the local interface device using the input/output circuit.

49. The method of claim 2, wherein the predetermined maximum distance is based on a signal range of the short range wireless communication system transmit/receive circuit.

50. The method of claim 1, wherein the at least one local interface device is further configured to be authenticated to the license server for only those user devices that are in direct wireless communication via the input/output circuit.

* * * * *